Figure 1:
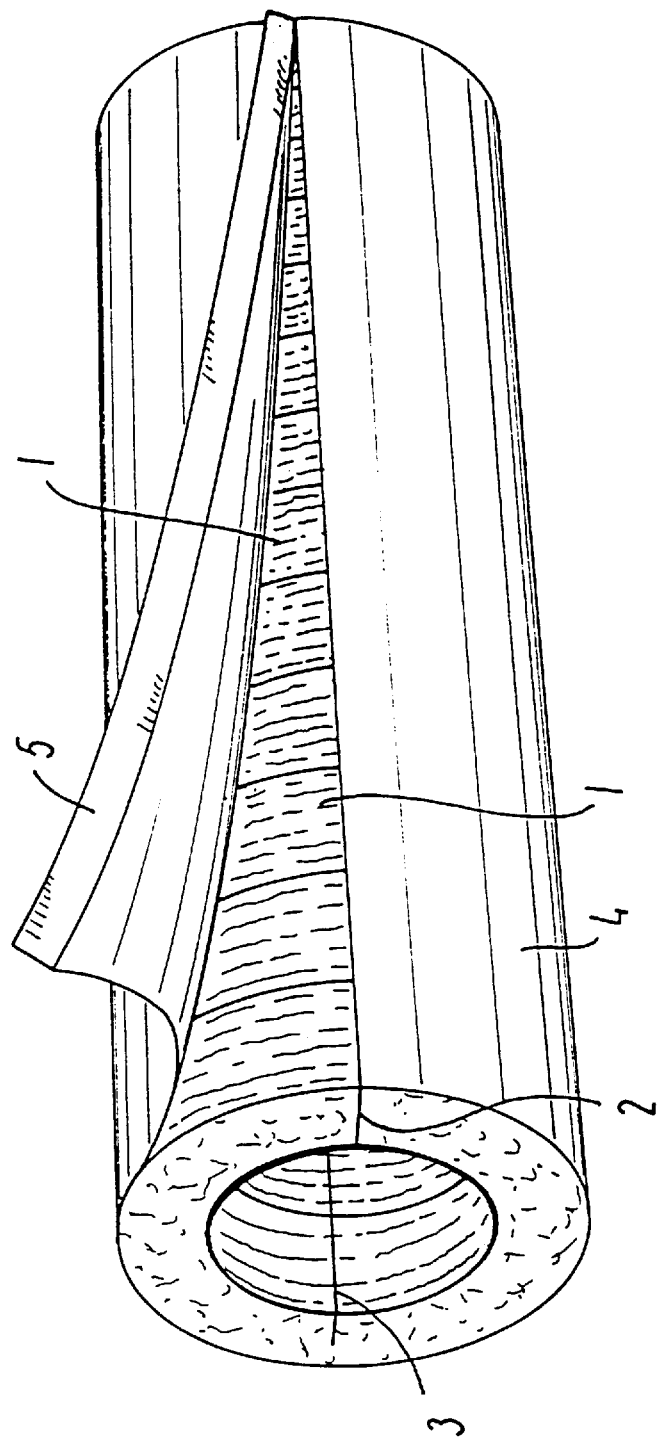

United States Patent
Cridland et al.

[11] Patent Number: 5,851,330
[45] Date of Patent: Dec. 22, 1998

[54] METHOD OF INSULATING A PIPE WITH A TUBULAR SHEATHING

[75] Inventors: Ian Cridland, Vanløse; Jens Husbjerg, Lyngby; Finn Ørtoft, Hedehusene, all of Denmark

[73] Assignee: Rockwool International A/S, Hedehusene, Denmark

[21] Appl. No.: 952,277

[22] PCT Filed: May 22, 1996

[86] PCT No.: PCT/DK96/00222

§ 371 Date: Dec. 16, 1997

§ 102(e) Date: Dec. 16, 1997

[87] PCT Pub. No.: WO96/37728

PCT Pub. Date: Nov. 28, 1996

[30] Foreign Application Priority Data

May 22, 1995 [DK] Denmark ................................ 0585/95

[51] Int. Cl.⁶ .............................. F16L 59/14; F16L 59/22
[52] U.S. Cl. ........................ 156/229; 156/212; 156/256
[58] Field of Search ................................... 156/212, 229, 156/250, 256, 293, 294

[56] References Cited

U.S. PATENT DOCUMENTS

| | | | |
|---|---|---|---|
| 4,205,105 | 5/1980 | Blundell | 428/36.4 |
| 4,428,991 | 1/1984 | Kampstrup-Larsen | 428/44 |
| 4,743,329 | 5/1988 | Hata | 156/287 |
| 5,024,249 | 6/1991 | Botsolas | 138/110 |
| 5,056,564 | 10/1991 | Roth | 138/149 |

*Primary Examiner*—James Sells
*Attorney, Agent, or Firm*—Watson Cole Grindle Watson, P.L.L.C.

[57] ABSTRACT

A method of insulating a pipe is described wherein a tubular sheathing comprising a radially slitted, tubular member of bonded mineral fibers oriented essentially in planes perpendicular to the longitudinal axis of the tubular member, and a sheet material, which by gluing is attached to the outer side of the tubular member, is mounted so as to envelop the pipe. The method being characterized in that the tubular sheathing, prior to being mounted on the pipe, is alternatingly compressed and stretched in the axial direction in a zone in which the tubular sheathing is to insulate a bend on the pipe.

6 Claims, 2 Drawing Sheets

METHOD OF INSULATING A PIPE WITH A TUBULAR SHEATHING

The present invention relates to a method of insulating a pipe wherein a tubular sheathing comprising an optionally radially slitted, tubular member of bonded mineral fibres oriented essentially in planes perpendicular to the longitudinal axis of the tubular member, and a sheet material, which by gluing is attached to the outer side of the tubular member, is mounted so as to envelop the pipe.

DK 157 627 B and 159 941 B disclose tubular sheathings of the above kind where the sheet material e.g. consists of a paper layer or a plastics or metal foil.

To facilitate the shaping of such a tubular sheathing around a pipe bend, the glue is applied in the form of essentially parallel, narrow stripes or rows of glue points, which stripes or rows extend substantially perpendicularly to the longitudinal axis of the tubular member.

In known tubular sheathings, the tubular member of mineral wool may be composed of a coaxial assembly of slitted insulation discs having a central hole.

According to a known method, cf. JP patent publication No. 6-137 485 , the assembly of discs is thus provided by sawing out from a stack of bonded mineral fiber sheets, whereafter the assembly thus obtained is enveloped in a sheet material e.g. of a corrugated metal foil.

The instant tubular sheathings are used for heat insulation of pipes for transport of hot or cold media, and in view of the handling as well as the mounting of the tubular sheathings on straight pipes it is important that they possess a certain rigidity.

Pipes of the above kind normally also comprise bends, e.g. 90° bends, and in order to be able to insulate such bends effectively it is important that the tubular sheathings are bendable without formation of sharp elbows.

The improved bendability of tubular sheathings where the glue is applied in stripes extending essentially perpendicularly to the longitudinal axis of the tubular sheathings, has turned out to entail such reduction of the is significantly impaired. When such tubular sheathings are placed on end, they thus tend to collapse.

The method according to the invention is characterized in that the tubular sheathing, prior to being mounted on the pipe, is alternatingly compressed and stretched in axial direction in a zone in which the tubular sheathing is to insulate a bend on the pipe.

The invention is based on the discovery that such treatment of a tubular sheathing of the kind stated in the premable entails that the bonds between the mineral fibres and/or the bonds between the outer side of the tubular sheathing and the sheet material in the zone in question are changed in such a way that the tubular sheathing at the particular site becomes easily bendable, but otherwise retains its rigidity across the remaining portion of the length of the tubular sheathing. As a consequence of the fibres in the tubular sheathing used being oriented in planes perpendicular to the longitudinal axis of the tubular sheathing, the tubular sheathing possesses high resistance in radial direction, and even after having been treated in the way described the tubular sheathing continues to possess considerable resistance to such deformation in the particular area, and consequently satisfactory insulation of the pipe in the bend-area is still obtainable.

The invention thus offers the advantage that use can be made of tubular sheathings which, by appropriate selection of density for the tubular mineral fiber member, amount and kind of binder for bonding the mineral fibres and sheet material, have a desired rigidity with respect to handling, and concomitantly that when insulating bends such bendability is obtainable that a good insulation on bends on the pipe is easily obtainable.

Consequently, it suffices to use one type of tubular sheathing for insulating both straight pipes and pipe bends.

The tubular sheathings used in the method according to the invention are preferably composed of an assembly of annular, axially slitted discs, a particularly large bendability hereby being obtained following a treatment as described.

The preparation of such tubular sheathings may be performed by providing a stack of sheets of mineral fibres essentially being oriented in planes parallel to the sheet sides, and by simultaneously cutting out a number of annular discs corresponding to the number of mineral fiber sheets by means of a band or string shaped saw in a direction of movement which is essentially perpendicular to the main surfaces of the mineral fiber sheets.

By cutting out the annular discs in the way described instead of e.g. punching them from individual mineral fiber sheets there are no particular requirements as to the strength of the mineral fiber sheets, and use can be made of mineral fiber sheets having a density which is optimum with respect to insulation capacity. Thus, it is possible to use mineral fiber sheets having a density as low as 20 kg/m$^3$. Preferably, use is made of mineral fiber sheets having a density of 20–120 kg/m$^3$. For the insulation of pipes for transport of media having a temperature of about 60° C., optimum insulation capacity is obtained by using mineral fiber discs having a density of 50–60 kg/m$^3$.

The tubular member expediently consists of loosely abutting discs, but, if desired, they may also be glued together so as to constitute a coherent element.

The mineral fiber sheets used for providing the annular discs or the tubular member are preferably sheets prepared by subjecting a mineral fiber web obtained by pendulum folding to a longitudinal and a vertical compression where the longitudinal compression ratio is preferably from 2:1 to 10:1, discs/a tubular member hereby being obtained having an optimum combination of strength and insulation capacity.

Prior to gluing the sheet material onto the outer side of the assembly of annular discs or the tubular member, the assembly or the tubular member is compressed, preferably in the longitudinal direction, to such an extent that the length is reduced by as much as 20%.

As a result of such compression the rigidity of the final tubular sheathing is increased without this causing a change of the bendability following the treatment described above.

The central hole in the insulation discs may be circular and have a diameter adapted to the outer diameter of a pipe to be insulated. However, it may be expedient to shape the hole in such a way that the tubular sheathing constituted by the insulation discs can be used for insulating pipes having different diameters, e.g. for insulating pipes having diameters varying between 21 mm and 27 mm.

On the inner side of the hole there may for example be provided radially inwardly directed protrusions having such flexibility as to be adaptable to pipes having different diameters, at the same time, however, ensuring that the aggregate tubular sheathing is fixed in relation to the pipe which it is to insulate.

When the tubular member in the form of an assembly of annular insulation discs has been provided, the assembly is preferably enveloped in sheet material while being mounted on a common mandrel, in order thereby to maintain correct orientation of the discs and ease the handling of the number of discs which are to constitute a finished tubular sheathing.

Thus, the rings provided by the cutting out may be pushed out of the stack as a unit and mounted coaxially in order subsequently to be enveloped in a sheet material, such as an aluminum foil, it is also possible to juxtapose several sets of cut out rings in succession so as to provide tubular sheathings of desired lengths, even up to very considerable lengths.

The sheet material is preferably a foil, e.g. a metal foil, such as an aluminum foil, having a thickness of 15–35 µm, e.g. 20 µm. A particularly good strength is obtained by using a reinforced aluminum foil. When the sheet material is a foil, it is advantageously attached to the outer side of the assembly of insulation discs by means of a binder, preferably a thermoplastic binder, e.g. comprising polyethylene. The affixation of the foil may in that case be effected by using a foil coated with a binder, and undertaking heating of the foil in connection with the application thereof on the assembly of insulation discs. A particularly good adhesion of the foil is achieved by mechanically pressing the heated foil against the outer side of the assembly of insulation discs. Hereby the binder is pressed into the fibrous insulation material. It is particularly advantageous to use a binder which is adhesive at room temperature.

However, use may also be made of an inorganic binder, such as a silicate binder. Instead of a metal foil, paper may be used. The sheet material is not necessarily attached to the discs by full adhesion, since it may suffice to glue it on in longitudinally extending stripes. A particularly good result is achieved with longitudinally extending wide stripes of a thermoplastic binder covering about 80% of the outer side of the tubular member.

Preferably, the sheet material is smooth, but may be corrugated with alternating protrusions and recesses extending perpendicularly to the longitudinal axis of the tubular sheathing.

Figure 2:
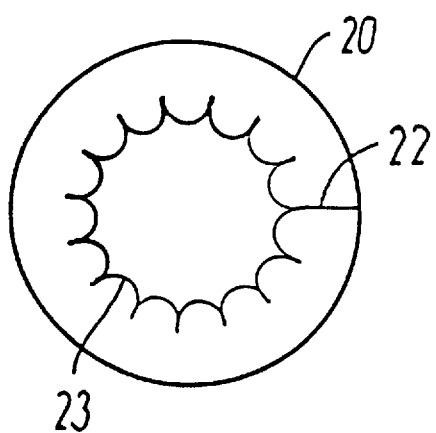
Figure 3:
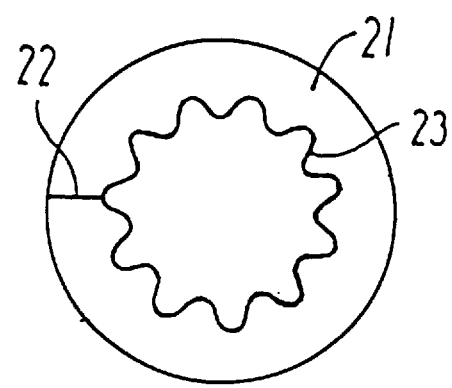

In the following the invention is described in more detail, reference being made to the drawing in which FIG. 1 is a perspective view of a tubular sheathing for use in the method according to the invention with a partly released sheet material, and FIGS. 2–3 are sectional views of annular mineral fiber discs having different hole shapes.

FIG. 1 shows a tubular sheathing composed of an assembly of annular insulation discs 1 consisting of mineral fibres, the assembly on one side having a first throughgoing cutting zone 2, and on the other side a second non-throughgoing cutting zone 3, the latter serving to facilitate the opening of the tubular sheathing when it is to be fitted on a pipe.

The assembly of insulation discs is enveloped in a sheet material 4 e.g. of aluminum foil which is glued onto the outer side of the assembly by means of an adhesive not shown. The portion of the sheet material 4 stretching along the throughgoing cutting zone 2 has an extension 5 which serves as overlapping zone after the mounting of the tubular sheathing on a pipe which it is desired to insulate and which is e.g. provided with a selfadhesive glue stripe.

FIG. 2 and FIG. 3 show annular insulation discs 20 21 respectively having axially extending cutting zones 22. The inner side of the insulation discs is provided with radially inwardly directed resilient protrusions 23 so as to be usable for insulating pipes having different outer diameters.

The cut out cores may optionally be used for cutting out further tubular sheathings having an outer diameter corresponding to the outer diameter of the cores. In that case any radial protrusions on the outer side of the core pieces must be removed.

We claim:

1. A method of insulating a pipe wherein a tubular sheathing comprising an optionally radially slitted tubular member of bonded mineral fibres oriented essentially in planes perpendicular to the longitudinal axis of the tubular member and a sheet material (4) which by gluing is attached to the outer side of the tubular member, is mounted so as to envelop the pipe, characterized in that the tubular sheathing, prior to being mounted on the pipe, is alternatingly compressed and stretched in axial direction in a zone in which the tubular sheathing is to insulate a bend on the pipe.

2. A method according to claim 1, characterized in that use is made of a tubular sheathing, the tubular member of which is constituted by an assembly of annular, axially slitted discs (1, 20, 21).

3. A method according to claim 2, characterized in that the assembly of annular, axially slitted discs (1, 20, 21) is prepared by providing a stack of sheets of mineral fibres essentially being oriented in planes parallel to the sheet sides, and by simultaneously cutting out a number of annular discs corresponding to the number of mineral fibre sheets.

4. A method according to claim 1, characterized in that use is made of tubular sheathings where the tubular member is prepared from a mineral fibre material having a density of 20–120 kg/m$^3$.

5. A method according to claim 1 characterized in that the tubular member is prepared from a mineral fiber sheets obtained by pendulum folding and subjected to a longitudinal and a vertical compression.

6. A method according to claim 1, characterized in that use is made of a tubular sheathing, the tubular member of which has been compressed in radial direction prior to it being provided with a sheet material.

\* \* \* \* \*